(12) United States Patent
Yang

(10) Patent No.: US 9,856,831 B2
(45) Date of Patent: Jan. 2, 2018

(54) INTEGRATED EGR COOLER

(71) Applicants: Hyundai Motor Company, Seoul (KR); Kia Motors Corporation, Seoul (KR)

(72) Inventor: Il Suk Yang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 124 days.

(21) Appl. No.: 14/858,869

(22) Filed: Sep. 18, 2015

(65) Prior Publication Data

US 2016/0230709 A1 Aug. 11, 2016

(30) Foreign Application Priority Data

Feb. 9, 2015 (KR) ........................ 10-2015-0019504

(51) Int. Cl.
| | |
|---|---|
| *F02M 25/07* | (2006.01) |
| *F02M 26/29* | (2016.01) |
| *F02M 26/28* | (2016.01) |
| *F02M 26/30* | (2016.01) |
| *F02M 26/32* | (2016.01) |
| *F02M 26/25* | (2016.01) |
| *F28D 21/00* | (2006.01) |

(52) U.S. Cl.
CPC ............ *F02M 26/29* (2016.02); *F02M 26/28* (2016.02); *F02M 26/30* (2016.02); *F02M 26/32* (2016.02); *F02M 26/25* (2016.02); *F28D 21/0003* (2013.01); *Y02T 10/16* (2013.01)

(58) Field of Classification Search
CPC ........ F02M 26/29; F02M 26/28; F02M 26/30; F02M 26/32; F02M 26/25; F28D 21/0003; F28F 27/02; Y02T 10/16
USPC ................................................... 123/568.12
See application file for complete search history.

(56) References Cited

U.S. PATENT DOCUMENTS

| | | | | |
|---|---|---|---|---|
| 2,392,638 | A | * | 1/1946 | Bowman .................... F28B 1/02 165/111 |
| 4,685,430 | A | * | 8/1987 | Ap ........................... F01M 5/00 123/142.5 R |
| 5,732,688 | A | * | 3/1998 | Charlton ................. F02D 21/08 123/568.12 |

(Continued)

FOREIGN PATENT DOCUMENTS

| | | |
|---|---|---|
| CN | 101603446 A | 12/2009 |
| EP | 2 014 892 A1 | 1/2009 |

(Continued)

*Primary Examiner* — Hai Huynh
*Assistant Examiner* — Gonzalo Laguarda
(74) *Attorney, Agent, or Firm* — Morgan, Lewis & Bockius LLP

(57) ABSTRACT

An integrated exhaust gas recirculation (EGR) cooler may include a cooling core having exhaust gas flowing therein, and an integrated housing accommodating the cooling core therein and having a coolant flowing therein, in which the integrated housing includes a coolant introduction port having the coolant introduced from an engine thereinto, a first exhaust port exhausting the coolant to a radiator, and a control valve controlling a flow of the coolant through the first exhaust port, and the cooling core includes U-shaped tubes including a bend so that a surface area is increased.

8 Claims, 17 Drawing Sheets

(56) References Cited

U.S. PATENT DOCUMENTS

| | | | |
|---|---|---|---|
| 7,380,544 B2 * | 6/2008 | Raduenz | F28D 9/0056 123/568.12 |
| 8,316,925 B2 | 11/2012 | Pimentel et al. | |
| 2008/0223563 A1 | 9/2008 | Penny et al. | |
| 2008/0314569 A1 | 12/2008 | Yamazaki et al. | |
| 2010/0258285 A1 | 10/2010 | Yao et al. | |
| 2010/0276131 A1 | 11/2010 | Barwig et al. | |
| 2014/0251579 A1 * | 9/2014 | Sloss | F01N 5/02 165/96 |
| 2015/0377180 A1 * | 12/2015 | Jacquot | F02G 5/02 60/320 |

FOREIGN PATENT DOCUMENTS

| | | |
|---|---|---|
| EP | 2 400 140 A2 | 12/2011 |
| FR | 2 972 031 A1 | 8/2012 |
| JP | 2000-38964 A | 2/2000 |
| JP | 2000-234566 A | 8/2000 |
| JP | 2004-257322 A | 9/2004 |
| JP | 2004-285919 A | 10/2004 |
| JP | 2009-2239 A | 1/2009 |
| JP | 2009-36077 A | 2/2009 |
| JP | 2010-112201 A | 5/2010 |
| JP | 2011-241789 A | 12/2011 |
| KR | 10-0823654 B1 | 4/2008 |
| KR | 10-2010-0051098 A | 5/2010 |
| KR | 10-2012-0002739 A | 1/2012 |
| KR | 10-2012-0130887 A | 12/2012 |
| WO | WO 2005/040574 A1 | 5/2005 |

\* cited by examiner

INTEGRATED EGR COOLER

CROSS-REFERENCE TO RELATED APPLICATION

The present application claims priority to Korean Patent Application No. 10-2015-0019504, filed Feb. 9, 2015, the entire contents of which is incorporated herein for all purposes by this reference.

BACKGROUND OF THE INVENTION

Field of the Invention

The present invention relates to an integrated exhaust gas recirculation (EGR) cooler, and more particularly, to an integrated EGR cooler capable to distributing a coolant exhausted from an engine to a heater or a radiator.

Description of Related Art

An exhaust gas recirculation (EGR) cooler according to the related art includes an EGR cooler cooling EGR gas, an EGR valve adjusting recirculation timing and an amount of the EGR gas, an EGR pipe connecting an intake manifold or an exhaust manifold and the EGR valve to each other, a cooling hose moving the coolant to the EGR cooler, and the like.

A coolant circulation circuit in the EGR cooler system according to the related art will be described below with reference to FIG. 1 and FIG. 2. The coolant circulation circuit for cooling exhaust gas introduced into an EGR cooler 3 generally includes a water temperature controller (WTC) 2 into which a coolant exhausted from an engine 1 is introduced, the EGR cooler 3 and a heater 4 to which the coolant exhausted from the engine 1 is distributed through the WTC 2, and a water pump 5 receiving the coolant transferred from the EGR cooler 3 and the heater 4 and again introducing the coolant into the engine 1.

As illustrated in FIG. 2, the EGR cooler 3 according to the related art includes an inlet tank 7 positioned at a front end of the EGR cooler 3 and having exhaust gas introduced thereinto and distributed to a cooling core 8, the cooling core 8 configured of a plurality of linear tubes and having the introduced exhaust gas contacting an inner side thereof and a coolant contacting an outer side thereof to generate heat exchange, a body 9 having a structure in which it encloses the plurality of linear tubes configuring the cooling core 8 and inducing a flow of the coolant at an outer side of the plurality of linear tubes, a nipple 10 introducing the coolant from the outside into the body 9 or exhausting the coolant from the body 9 to the outside, and an outlet tank 11 exhausting the exhaust gas cooled through the cooling core 9 to the outside.

However, the EGR cooler according to the related art has a limitation in cooling efficiency since a flow rate of coolant supplied to the EGR cooler is equal or smaller to or than a flow rate of coolant supplied to the heater.

In addition, the EGR cooler and the water temperature controller according to the related art should be repeatedly provided with the same components such as the nipples, the outlet tanks, and the like, in order to introduce and exhaust the coolant.

In addition, the EGR cooler according to the related art has been required to secure a space in which associated components are to be separately mounted. Therefore, the EGR cooler according to the related art had a difficulty in a layout design.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an integrated exhaust gas recirculation (EGR) cooler with which a water temperature controller (WTC) is integrated.

According to various aspects of the present invention, an integrated exhaust gas recirculation (EGR) cooler may include a cooling core having exhaust gas flowing therein, and an integrated housing accommodating the cooling core therein and having a coolant flowing therein, in which the integrated housing may include a coolant introduction port having the coolant introduced from an engine thereinto, a first exhaust port exhausting the coolant to a radiator, and a control valve controlling a flow of the coolant through the first exhaust port, in which the cooling core includes U-shaped tubes including a bend so that a surface area is increased.

The cooling core may include a plurality of the U-shaped tubes bent in a U-shape, a plate having the plurality of U-shaped tubes welded thereto and surface-contacting an EGR valve housing, and a separator extended from the plate so as to be positioned at a central space formed by the plurality of U-shaped tubes.

The integrated housing further may include a second exhaust port exhausting the coolant to a heater.

The first exhaust port may be connected to the radiator to form a first distribution line, and the second exhaust port may be connected to the heater to form a second distribution line.

The integrated EGR cooler may further include an EGR valve housing in which a first chamber connected to an exhaust manifold and a second chamber connected to an intake manifold are formed, where the first and second chambers may be communicatively coupled with each other through the cooling core, and the integrated housing may be mounted on the EGR valve housing so that the cooling core is accommodated thereinto.

The EGR valve housing may include an EGR valve connected to the second chamber.

The integrated housing may include a body forming an appearance of the EGR cooler housing and having a first surface in a length direction and a second surface in a width direction that are opened, an adapter mounted on the opened first surface of the body in the length direction and provided with the coolant introduction port, and a gasket interposed between the body and the adapter.

The gasket may include a main path formed therein in order to direct the coolant into the body, an auxiliary path formed at a side of the main path so that the coolant is uniformly directed toward the cooling core provided in the body, and a bypass path formed therein in order to direct the coolant to a thermo-sensitive device mounted in the body.

The body may include a mounting port formed in the body so that the thermo-sensitive device connected to the control valve is mounted and in communication with the bypass path, and a bypass port formed at a side of the mounting port in order to circulate the coolant introduced into the mounting port to a water pump, and the first exhaust port may be formed on a surface that is symmetrical to the adaptor.

The second exhaust port may be formed in the EGR valve housing.

The EGR valve housing may be attached to the body so as to be directed toward the opened second surface of the body in the width direction.

According to various aspects of the present invention, an integrated EGR cooler may include an integrated housing having a coolant and exhaust gas introduced thereinto and then exhausted therefrom and mounted with a thermo-sensitive device, and a first distribution line formed in the integrated housing so as to exhaust the coolant introduced into the integrated housing only when the thermo-sensitive device is operated.

According to various aspects of the present invention, an integrated EGR cooler may include an integrated EGR cooler in which heat is exchanged between a coolant exchanging heat with an engine and exhaust gas, a heater exchanging heat with a coolant exhausted from the integrated EGR cooler, and a radiator exchanging heat with the coolant exhausted from the integrated EGR cooler.

The integrated EGR cooler may be configured to block a flow of the coolant toward the radiator when a temperature of the coolant flowing therein is lower than a predefined temperature.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
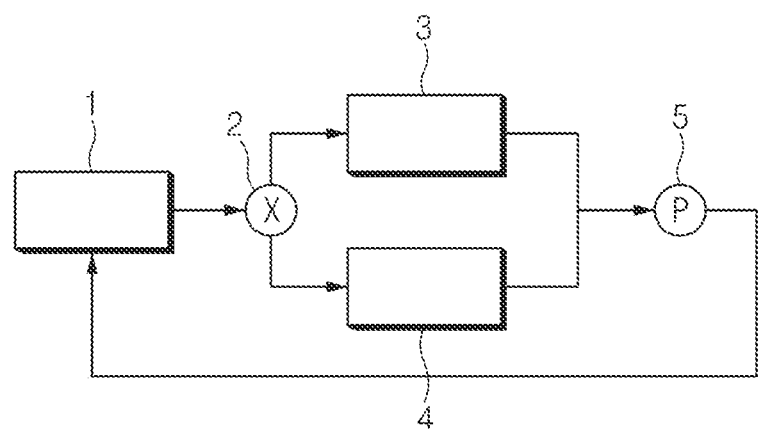
FIG. 1 is a block diagram illustrating a flow of a coolant applied to an exhaust gas recirculation (EGR) cooler according to the related art.
Figure 2:
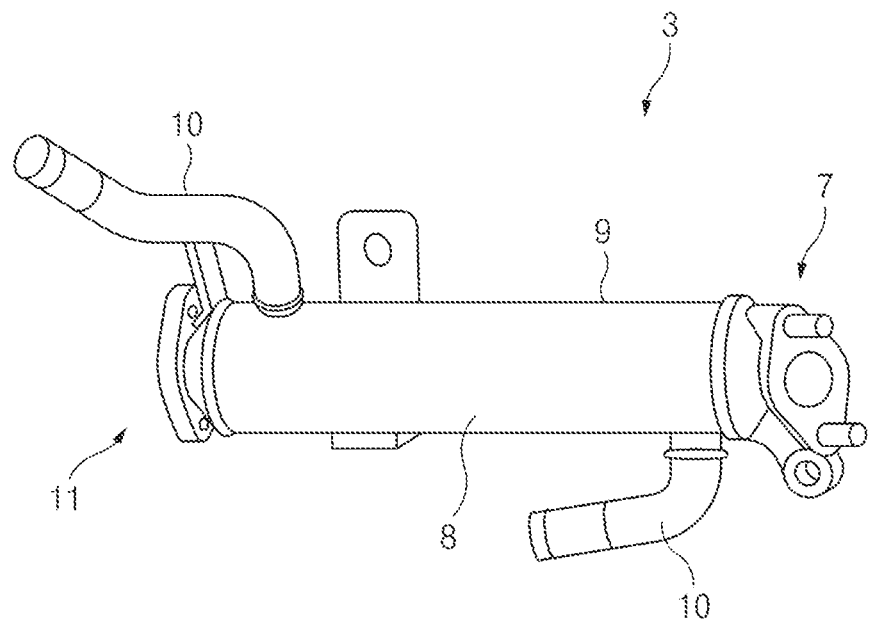
FIG. 2 is a schematic view of the EGR cooler according to the related art.
Figure 3:
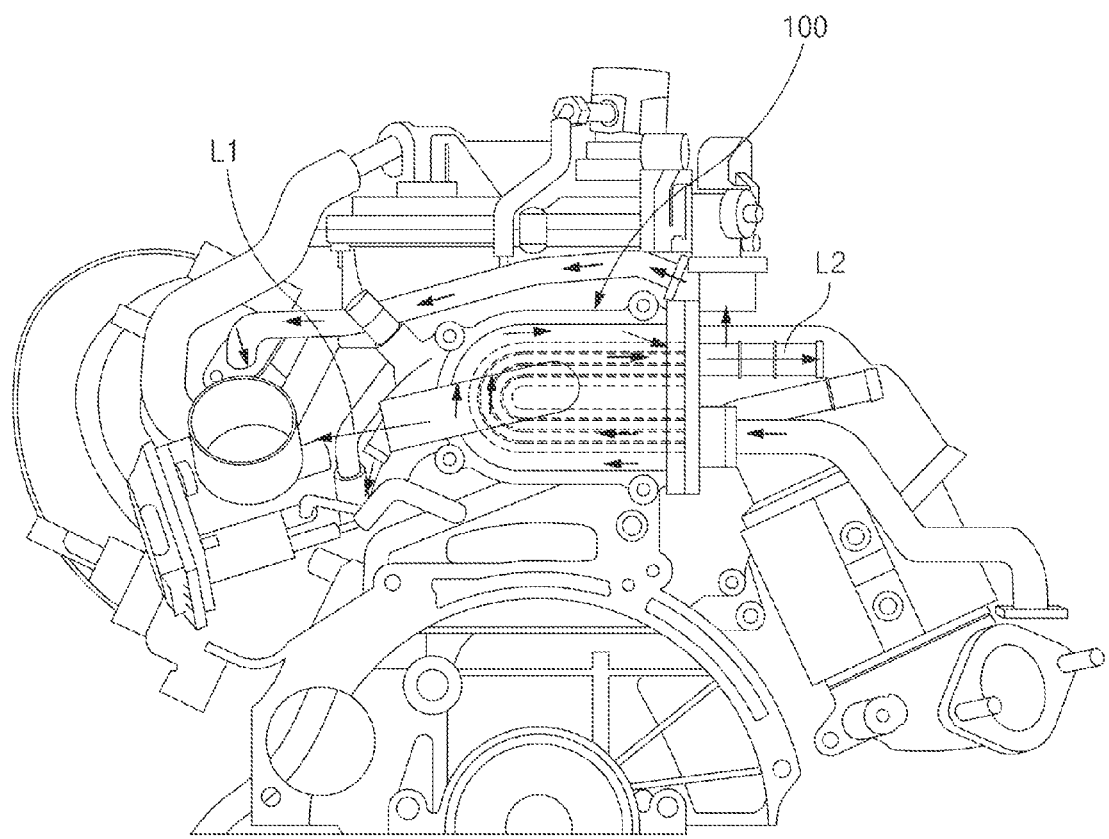
FIG. 3 is a view illustrating an example in which an exemplary integrated EGR cooler according to the present invention is mounted.
Figure 4:
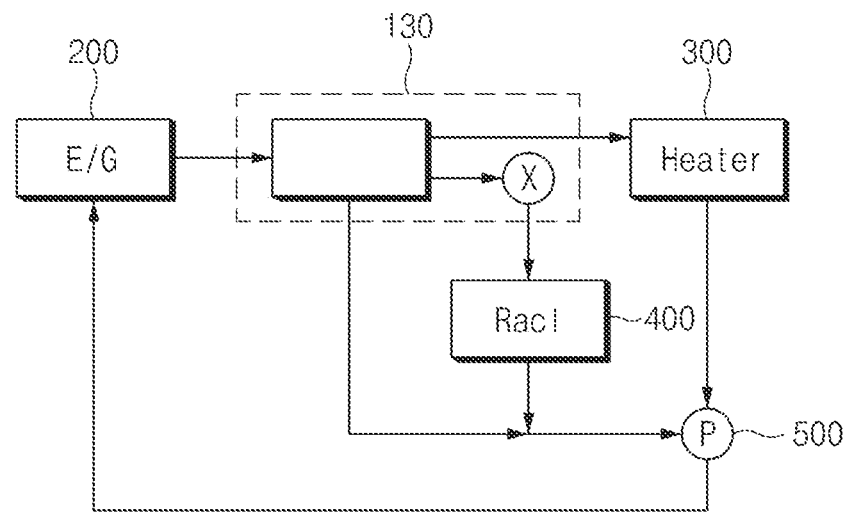
FIG. 4 is a block diagram illustrating a flow of a coolant of the exemplary integrated EGR cooler of FIG. 3.
Figure 5:
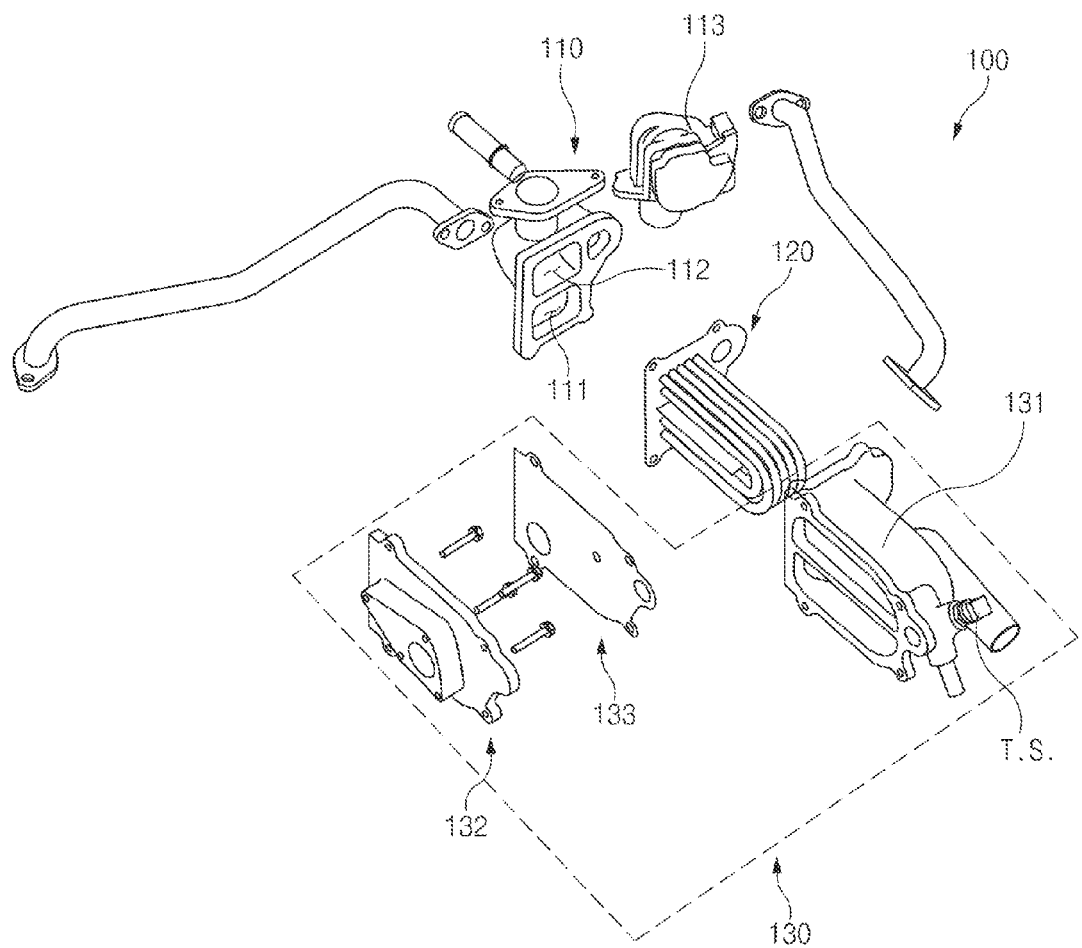
FIG. 5 is an exploded perspective view of the exemplary integrated EGR cooler of FIG. 3.
Figure 6:
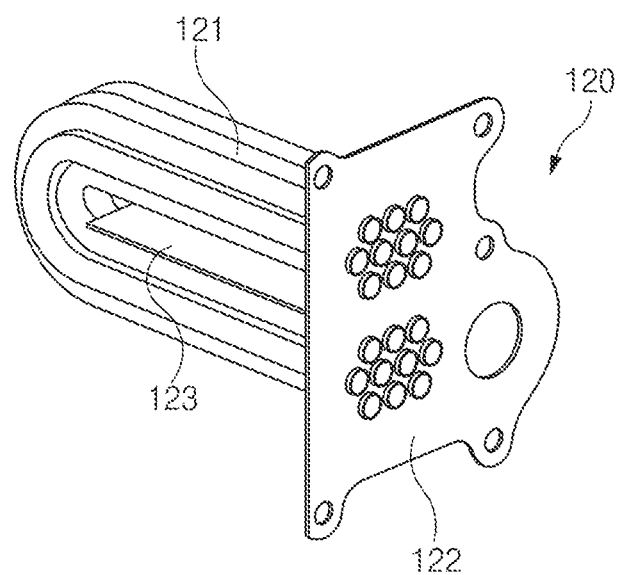
FIG. 6 is a perspective view of a cooling core mounted in the exemplary integrated EGR cooler of FIG. 3.
Figure 7:
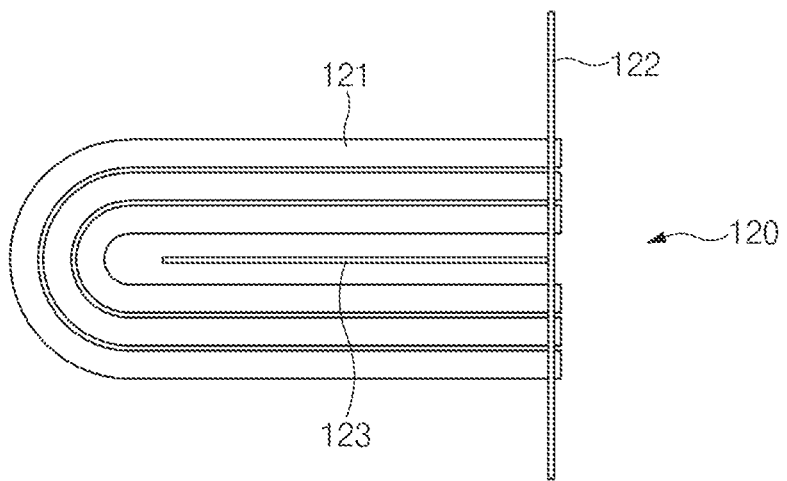
FIG. 7 is a front view of the cooling core mounted in the exemplary integrated EGR cooler of FIG. 3.
Figure 8:
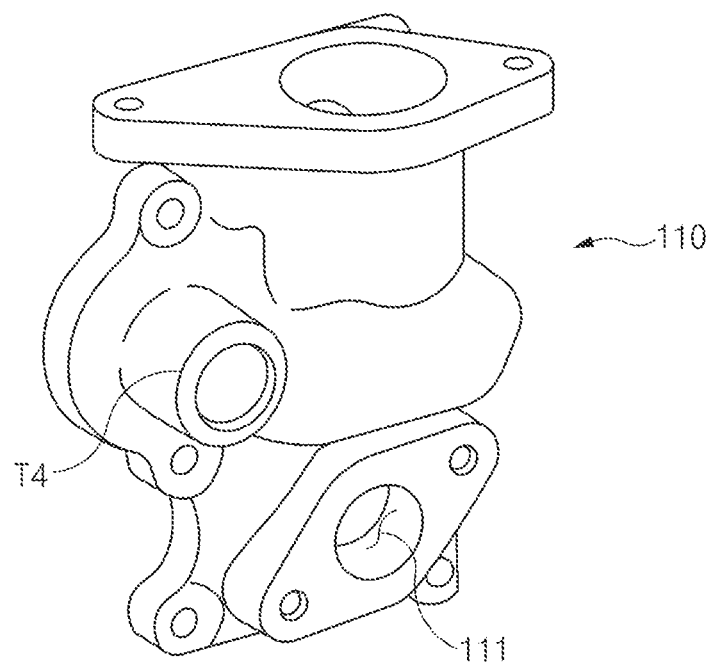
FIG. 8 is a perspective view of an EGR valve housing mounted in the exemplary integrated EGR cooler of FIG. 3.
Figure 9:
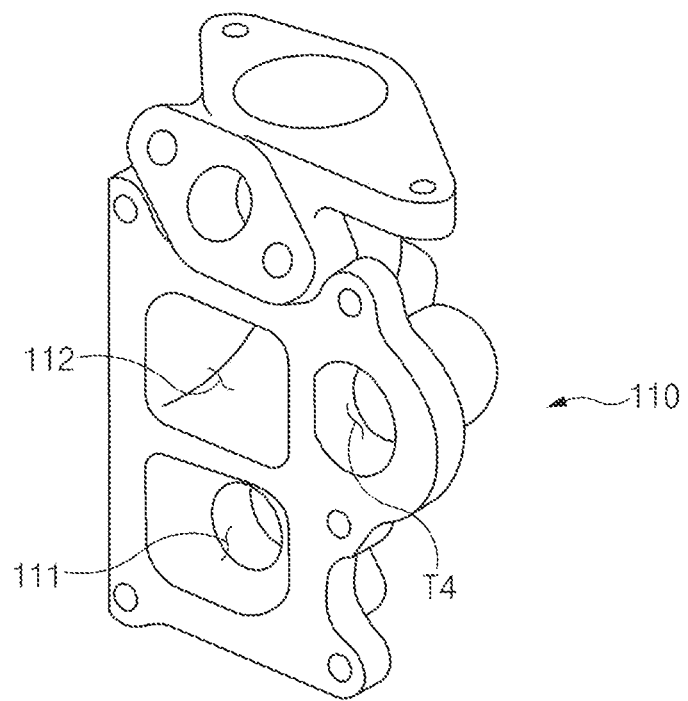
FIG. 9 is another perspective view of the EGR valve housing mounted in the exemplary integrated EGR cooler of FIG. 3.
Figure 10:
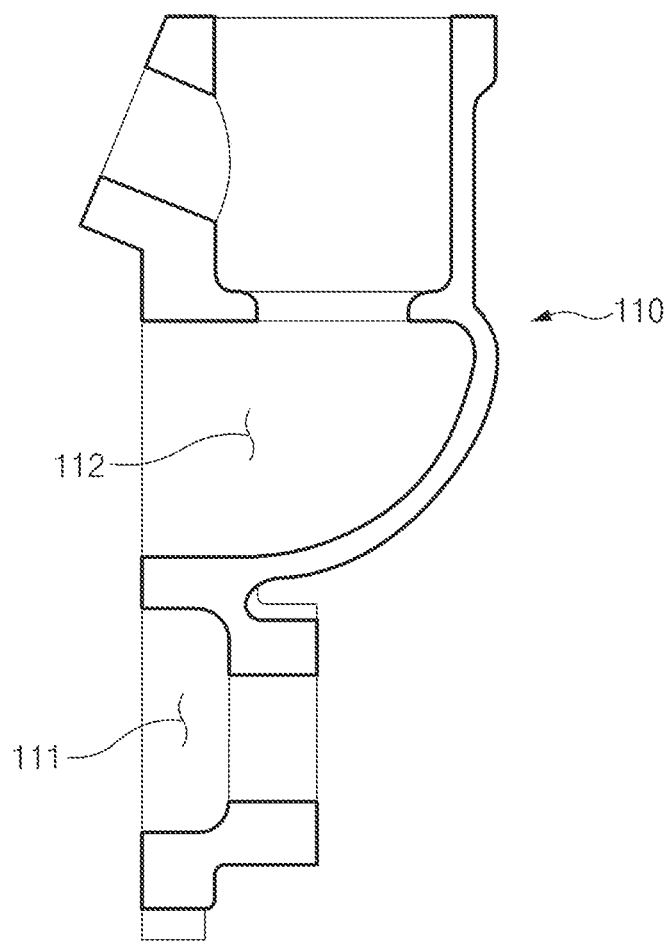
FIG. 10 is a cross-sectional view of main parts of the EGR valve housing mounted in the exemplary integrated EGR cooler of FIG. 3.
Figure 11:
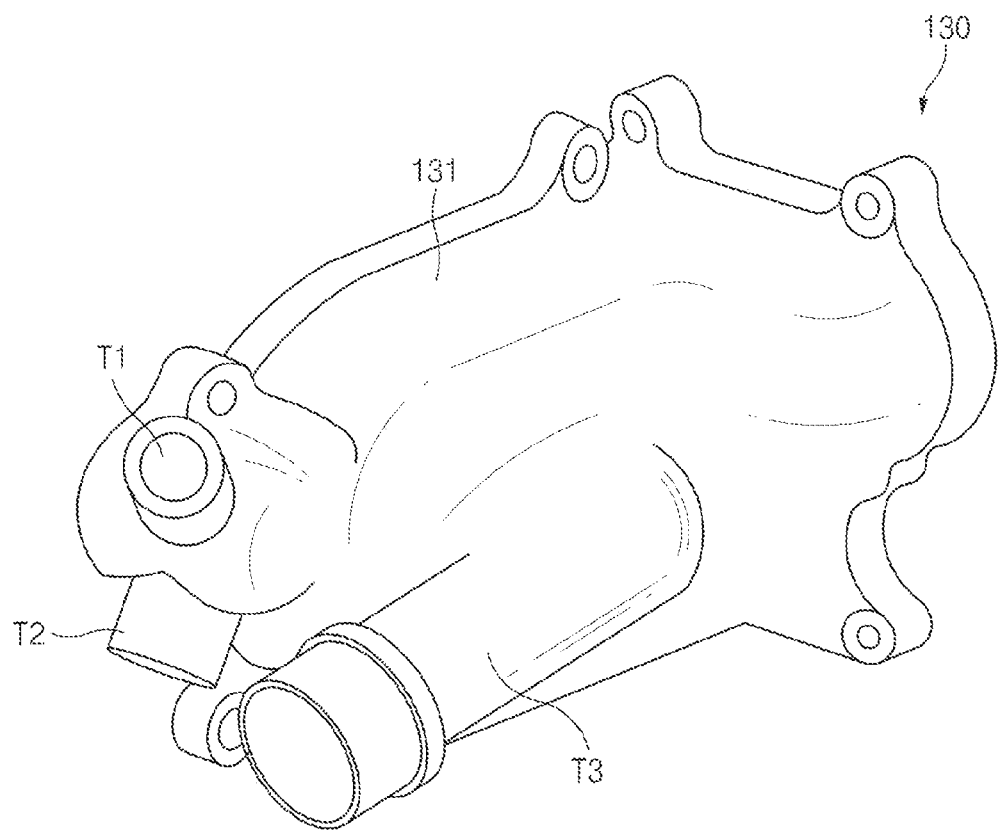
FIG. 11 is a perspective view of an integrated housing mounted in the exemplary integrated EGR cooler of FIG. 3.
Figure 12:
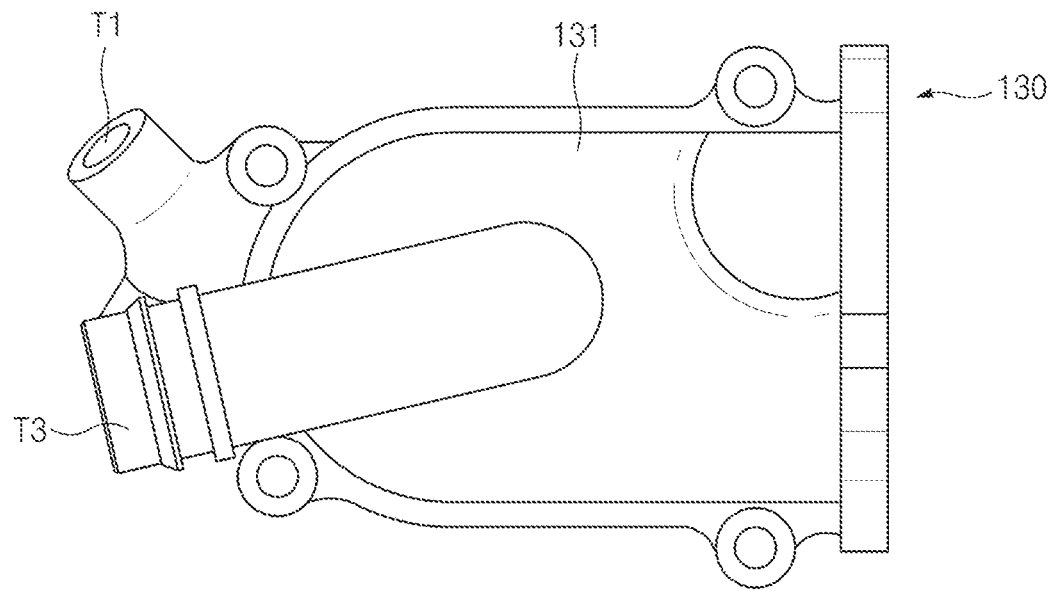
FIG. 12 is a front view of the integrated housing mounted in the exemplary integrated EGR cooler of FIG. 3.
Figure 13:
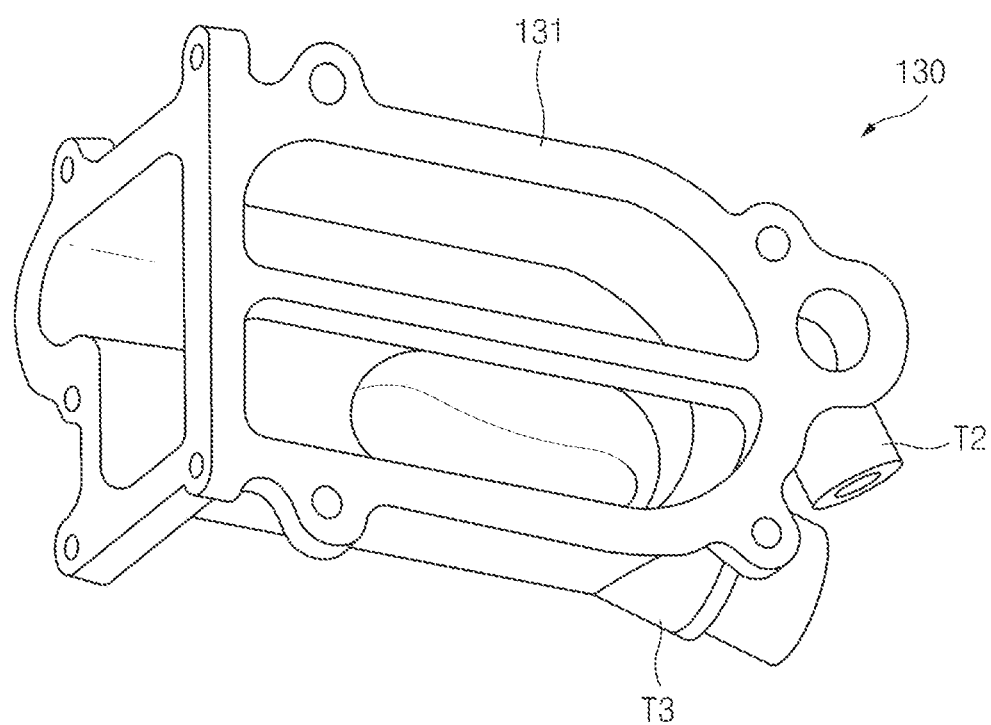
FIG. 13 is another perspective view of the integrated housing mounted in the exemplary integrated EGR cooler of FIG. 3.
Figure 14:
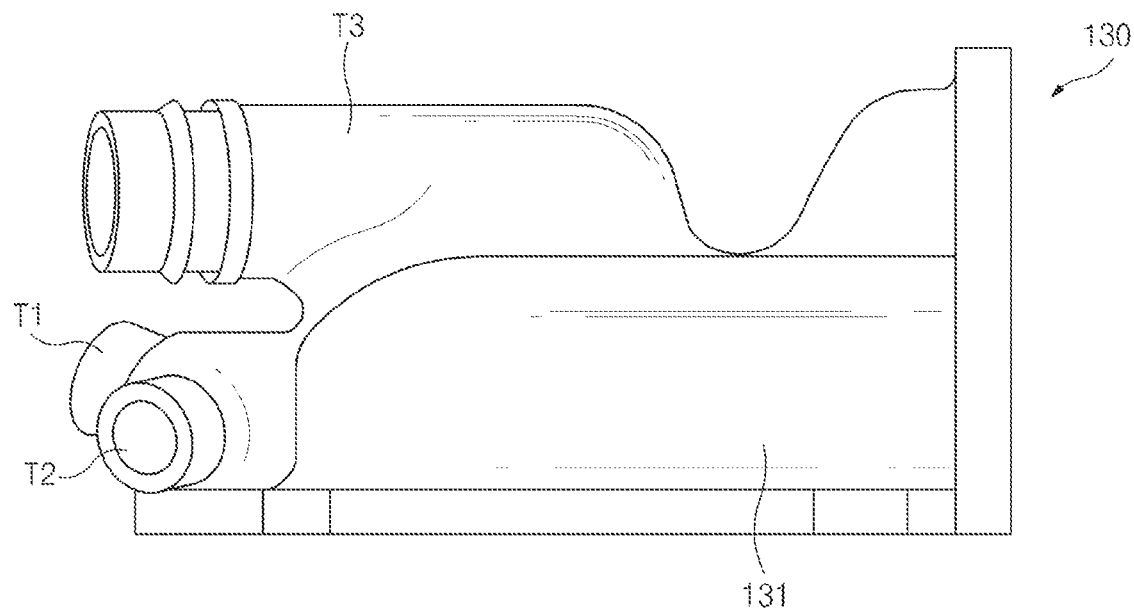
FIG. 14 is a bottom view of the integrated housing mounted in the exemplary integrated EGR cooler of FIG. 3.
Figure 15:
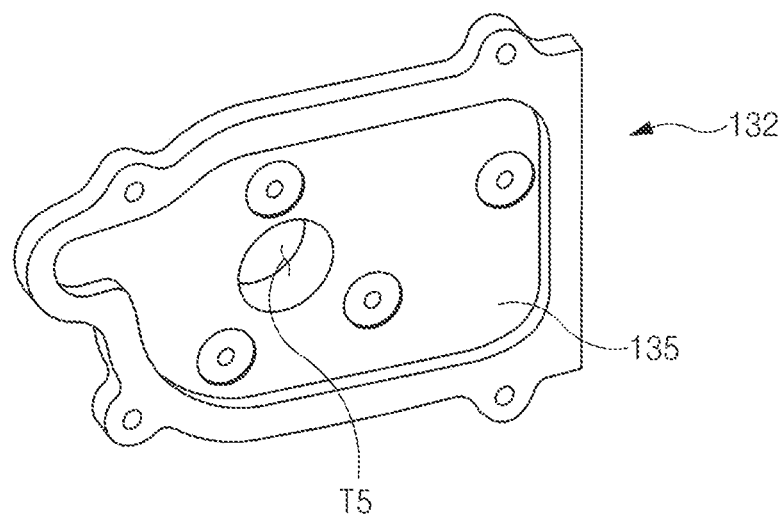
FIG. 15 is a perspective view of an adapter mounted in the exemplary integrated EGR cooler of FIG. 3.
Figure 16:
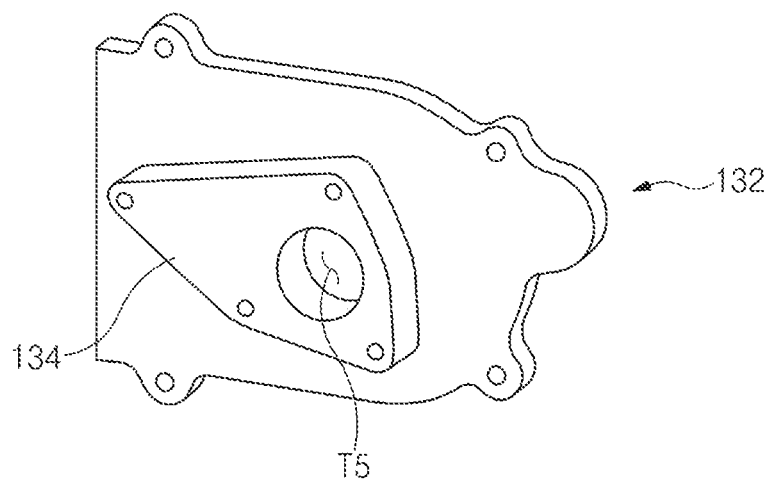
FIG. 16 is another perspective view of the adapter mounted in the exemplary integrated EGR cooler of FIG. 3.
Figure 17:
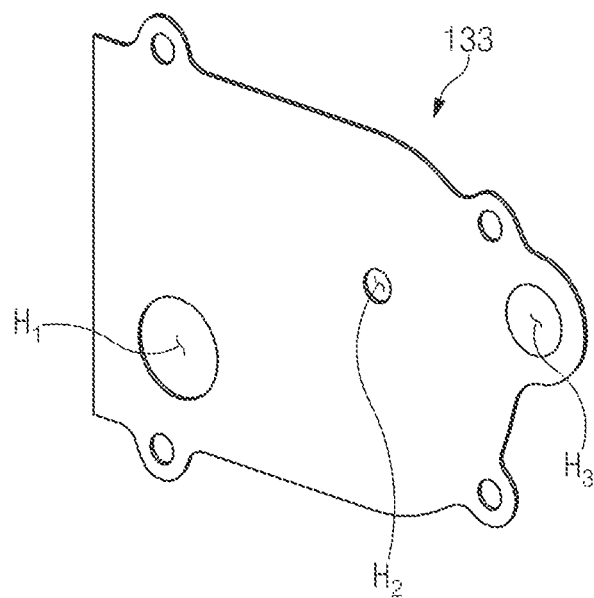
FIG. 17 is a perspective view of a gasket mounted in the exemplary integrated EGR cooler of FIG. 3.

As illustrated in FIG. 3 to FIG. 17, an integrated exhaust gas recirculation (EGR) cooler according to various embodiments of the present invention is characterized in that a thermostat T.S. is mounted as a thermo-sensitive device in an EGR cooler 100, a first distribution line L1 exhausting a coolant introduced into the EGR cooler 100 only when the thermostat T.S. is operated is formed, and a second distribution line L2 always exhausting the coolant introduced into the EGR cooler 100 is formed.

The EGR cooler 100 includes an EGR valve housing 110 in which a first chamber 111 connected to an exhaust manifold and a second chamber 112 connected to an intake manifold are formed, a cooling core 120 mounted on the EGR valve housing 110 so as to allow the first and second chambers 111 and 112 to be in communication with each other, and an integrated housing 130 mounted on the EGR valve housing 110 so that the cooling core 120 is inserted thereinto. The EGR valve housing 110 includes an EGR valve 113 connected to the second chamber 112.

The cooling core 120 is manufactured by bending U-shaped tubes 121 having a spiral or dimple shaped surface bend in a U shape. The cooling core 120 includes a plurality of U-shaped tubes 121 bent in the U shape, a plate 122 having the plurality of U-shaped tubes 121 welded thereto and surface-contacting the EGR valve housing 110, and a separator 123 extended from the plate 122 so as to be positioned at a central space formed by the U-shaped tubes 121. The separator 123 guides the coolant so as to flow along the plurality of U-shaped tubes 121 having the U shape.

The integrated housing 130 includes a body 131 forming an appearance of the integrated housing 130 and having one surface in a length direction and one surface in a width direction that are opened, an adapter 132 mounted on the opened one surface of the body 131 in the length direction and provided with a coolant introduction port T5 into which the coolant is introduced from an engine 200, and a gasket 133 interposed between the body 131 and the adapter 132.

The adapter 132 and the gasket 133 receive the coolant supplied from the rear of a cylinder head and separate a flow of the coolant supplied from the engine 200 into the cooling core 120 or the thermostat T.S. The adapter 132 has a cylinder head mounting part 134 formed on one surface thereof in order to mount the adapter 132 on the engine 200 and has an integrated housing mounting part 135 formed on the other surface thereof in order to fix the integrated housing 130.

The gasket 133 includes a main path $H_1$ formed therein in order to induce the coolant into the body 131, an auxiliary path $H_2$ formed at one side of the main path $H_1$ so that the coolant may be uniformly induced toward the cooling core 120 provided in the body 131, and a bypass path $H_3$ formed therein in order to induce the coolant to the thermostat T.S. mounted in the body 131.

The body 131 includes a mounting port T1 formed in the body 131 so that the thermostat T.S. is mounted and being in communication with the bypass path $H_3$, a bypass port T2 formed at one side of the mounting port T1 in order to circulate the coolant introduced into the mounting port T1 to a water pump 500, and a first exhaust port T3 formed on a surface that is symmetrical to the adaptor 132 so as to exhaust the coolant from the body 131. In various embodiments of the present invention, the first exhaust port T3 is connected to a radiator 400.

The EGR valve housing 110 includes a second exhaust port T4 formed therein in order to exhaust the coolant flowing to the EGR valve housing 110 through the opened one surface of the body 131 in the width direction to the outside of the body 131. In the various embodiments of the present invention, the second exhaust port T4 is connected to a heater 300. The heater 300 generates heat exchange between the coolant and introduced external air. A temperature of the coolant is lowered through the heater 300, and a temperature of the introduced external air is raised through the heater 300. The external air may be exhausted to the outside, and is introduced into a chamber, if necessary, to thereby be used for vehicle heating. In the EGR cooler 100 according to various embodiments of the present invention configured as described above, exhaust gas is introduced from the exhaust manifold into the EGR valve housing 110 and into the cooling core 120. Here, a temperature of the exhaust gas introduced into the cooling core 120 is lowered by the coolant introduced into the EGR valve housing 110. As soon as the EGR valve 113 is opened, the exhaust gas introduced into the cooling core 120 is recirculated to the intake manifold.

Here, a flow of the coolant introduced into the integrated housing 130 is as follows. The coolant is exhausted from the engine 200, more accurately, the cylinder head. The coolant exhausted from the engine 200 is introduced between the adapter 132 and the gasket 133 through the coolant introduction port T5 formed in the adapter 132. Then, the coolant is introduced into the body 131 through the main path $H_1$ and the auxiliary path $H_2$ formed in the gasket 133. The coolant introduced into the body 131 absorbs a temperature of the exhaust gas present in the cooling core 120 through conduction and radiation.

Meanwhile, the coolant exhausted to the engine 200 through the bypass path $H_3$ formed in the gasket 133 is introduced into the mounting port T1 on which the thermostat T.S. is mounted. The coolant introduced into the mounting port T1 flows to the water pump 500 through the bypass port T2. The thermostat T.S. is made of a bimetal and is operated to open the first exhaust port T3 when a temperature thereof is a specific temperature or more.

The coolant introduced into the body 131 is continuously introduced into the heater 300 through the second exhaust port T4 formed in the EGR valve housing 110. The coolant introduced into the heater 300 flows to the water pump 500, and is ultimately re-introduced into a water jacket formed in the engine 200.

In addition, when a temperature of the coolant exhausted from the engine 200 is a specific temperature or more, a control valve connected to the thermostat T.S. is operated to open the first exhaust port T3, and the coolant introduced into the body 131 is introduced into the radiator 400 through the first exhaust port T3 to discharge heat to the outside. Then, the coolant flows from the radiator 400 to the water pump 500, and is ultimately re-introduced into the water jacket formed in the engine 200.

As described above, with the integrated EGR cooler according to the exemplary embodiment of the present invention, the WTC and the EGR cooler are integrated with each other, such that the coolant exhausted from the engine is first introduced into the EGR cooler, thereby making it possible to maximize an amount of the coolant introduced into the EGR cooler. Therefore, cooling efficiency may be maximized, and a size of the cooling core may be decreased.

In addition, the number of components for introducing and exhausting the coolant is minimized, and a layout design of an engine room becomes easy.

Further, a size of the EGR cooler is decreased and the number of components in the EGR cooler is decreased, such that a total weight of a vehicle is decreased, thereby making it possible to improve fuel efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. An integrated exhaust gas recirculation (EGR) cooler comprising:
  a cooling core having exhaust gas flowing therein; and
  an integrated housing accommodating the cooling core therein and having a coolant flowing therein,
  wherein the integrated housing includes:
    a body;
    an adapter mounted on the body;
    a gasket interposed between the body and the adapter;
    a coolant introduction port having the coolant introduced from a rear of a cylinder head of an engine thereinto;
    a first exhaust port exhausting the coolant to a radiator;

a second exhaust port exhausting the coolant to a heater; and a control valve controlling a flow of the coolant through the first exhaust port, and wherein the cooling core includes U-shaped tubes including a bend so that a surface area is increased, wherein the gasket includes:

a main path formed therein in order to direct the coolant into the body;

an auxiliary path formed at a side of the main path so that the coolant is uniformly directed toward the cooling core provided in the body; and a bypass path formed therein in order to direct the coolant to a thermo-sensitive device mounted in the body.

2. The integrated EGR cooler according to claim 1, wherein the cooling core comprises:

a plurality of the U-shaped tubes bent in a U-shape;

a plate having the plurality of U-shaped tubes welded thereto and surface-contacting an EGR valve housing; and a separator extended from the plate so as to be positioned at a central space formed by the plurality of U-shaped tubes.

3. The integrated EGR cooler according to claim 1, wherein the first exhaust port is connected to the radiator to form a first distribution line, and the second exhaust port is connected to the heater to form a second distribution line.

4. The integrated EGR cooler according to claim 1, further comprising an EGR valve housing in which a first chamber connected to an exhaust manifold and a second chamber connected to an intake manifold are formed, wherein the first and second chambers are communicatively coupled with each other through the cooling core, and the integrated housing is mounted on the EGR valve housing so that the cooling core is accommodated thereinto.

5. The integrated EGR cooler according to claim 4, wherein the EGR valve housing includes an EGR valve connected to the second chamber.

6. The integrated EGR cooler according to claim 1, wherein the body comprises:

a mounting port formed in the body so that the thermo-sensitive device connected to the control valve is mounted and in communication with the bypass path; and a bypass port formed at a side of the mounting port in order to circulate the coolant introduced into the mounting port to a water pump, and the first exhaust port is formed on a surface that is symmetrical to the adaptor.

7. The integrated EGR cooler according to claim 4, wherein the second exhaust port is formed in the EGR valve housing.

8. The integrated EGR cooler according to claim 7, wherein the EGR valve housing is attached to the body so as to be directed toward the opened second surface of the body in the width direction.

* * * * *